United States Patent
Berwanger

(10) Patent No.: US 6,241,052 B1
(45) Date of Patent: *Jun. 5, 2001

(54) INTEGRATED AIRCRAFT WHEEL, BRAKE AND AXLE

(75) Inventor: Fred William Berwanger, South Bend, IN (US)

(73) Assignee: AlliedSignal Inc., Morristown, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/306,597

(22) Filed: May 6, 1999

Related U.S. Application Data

(63) Continuation of application No. 08/672,894, filed on Jun. 28, 1996, now Pat. No. 5,944,147.

(51) Int. Cl.$^7$ .................................................... F16D 55/36
(52) U.S. Cl. ........................................................... 188/71.5
(58) Field of Search ................................. 188/71.5, 76.6, 188/18 A, 88, 72.5; 241/111, 110 A; 301/6.1, 6.2, 6.8

(56) References Cited

U.S. PATENT DOCUMENTS

| | | |
|---|---|---|
| 2,043,933 | * 6/1936 | Sohl ........................................ 301/6.8 |
| 3,038,559 | * 6/1962 | Hirzel ..................................... 188/82.5 |
| 3,357,519 | * 12/1967 | Anderson et al. ................... 188/18 A |
| 3,829,162 | * 8/1974 | Stimson ................................. 301/6.8 |
| 3,977,631 | * 8/1976 | Jenny ..................................... 188/71.6 |
| 4,944,370 | * 7/1990 | Chambers et al. ................... 188/71.6 |

\* cited by examiner

Primary Examiner—Matthew C. Graham
(74) Attorney, Agent, or Firm—Larry J. Palguta

(57) ABSTRACT

The integrated aircraft wheel, brake and axle comprises a hollow wheel and brake axle (16, 116) having longitudinal splines (17, 117) about its outer periphery, the longitudinal splines (17, 117) engaging splines (62, 162) of a piston housing (60, 160) to effect a non-rotatable connection therebetween. In one embodiment, the piston housing (60) is connected by way of a spline sleeve (70) with a backing plate (80). A wheel (45) is rotatably mounted upon an end of the brake axle (16) and includes a drum drive (52) which extends axially to a drum drive end (52A) having at its inner diameter a bearing assembly (55, 56) between the drum drive end (52A) and an outer diameter of the piston housing (60). In another embodiment, the drum drive (152) may include a thrust flange (151) engaging a rotor disc backing plate (192A). A plurality of stator discs (90, 190) are connected non-rotatably with the spline sleeve (70, 170) and splines (17, 117) of the brake axle (16, 116) and a plurality of rotors (92, 192) are connected with a plurality of splines (53, 153) attached to the inner diameter of the drum drive (52, 152). The brake axle(s) (16, 116) is connected non-rotatably to a brake torque take-out arm(s) (18, 22, 118) which is connected with a brake rod(s) (20, 24) for attachment to a strut (12) of the aircraft Either a pair of brake torque take-out arms (22) and brake rods (24) or a single brake torque take-out arm (18, 118) and brake rod (20) aligned axially with the strut (12) may be utilized with an axle.

16 Claims, 6 Drawing Sheets

INTEGRATED AIRCRAFT WHEEL, BRAKE AND AXLE

This is a continuation of patent application Ser. No. 08/672,894 filed Jun. 28, 1996 now U.S. Pat. No. 5,944,147.

The present invention relates generally to an integrated aircraft wheel, brake and axle, and in particular to the piston housing and stators of the brake connected non-rotatably with the brake axle which is connected to a brake torque-take-out arm(s) and brake rod(s), and rotors connected non-rotatably with a drum drive attached to a wheel half.

Aircraft brakes have previously comprised basic structural elements such as a torque take-out arm integral with a piston housing, a brake rod, a torque tube, a plurality of stators connected non-rotatably with the torque tube, and a plurality of rotors connected non-rotatably with an inboard wheel half. Chambers et al U.S. Pat. No. 4,944,370 discloses the use of a drum drive that is connected with the inboard wheel half and providing splines for non-rotatable connection with the rotors. It is highly desirable to reduce the weight and improve the stability of aircraft landing systems by combining certain principle structures in order to shorten load paths and increase rigidity. It is desirable to provide a single structure for primary brake loads and primary wheel loads rather than two independently loaded systems. The dynamic response of such a wheel and brake system should be significantly reduced and its analysis simplified, compared with prior aircraft wheel and brake systems. The synergy provided by combining the axle, brake and wheel structural elements can lead to a reduction in bending load components which permits a reduction in section thickness, more robust and dynamically stable structures, more predictable stresses and dynamic response, a reduction in the number of parts, and in some cases an increase in wearable brake material and/or heat sink mass.

The present invention provides solutions to the above by providing an aircraft wheel and brake, comprising a brake axle having thereabout spline means, a piston housing having complementary spline means engaging the spline means of the brake axle, a plurality of stator discs connected non-rotatably with the spline means of the axle, a wheel mounted rotatably on the axle and including an axially extending brake drum connected therewith, the brake drum including a plurality of splines, a plurality of rotor discs connected non-rotatably with the splines of the drum, and bearing means located between an end of the drum and the piston housing.

The invention is described in detail below with reference to the drawings which illustrate embodiments in which.

Figure 1:
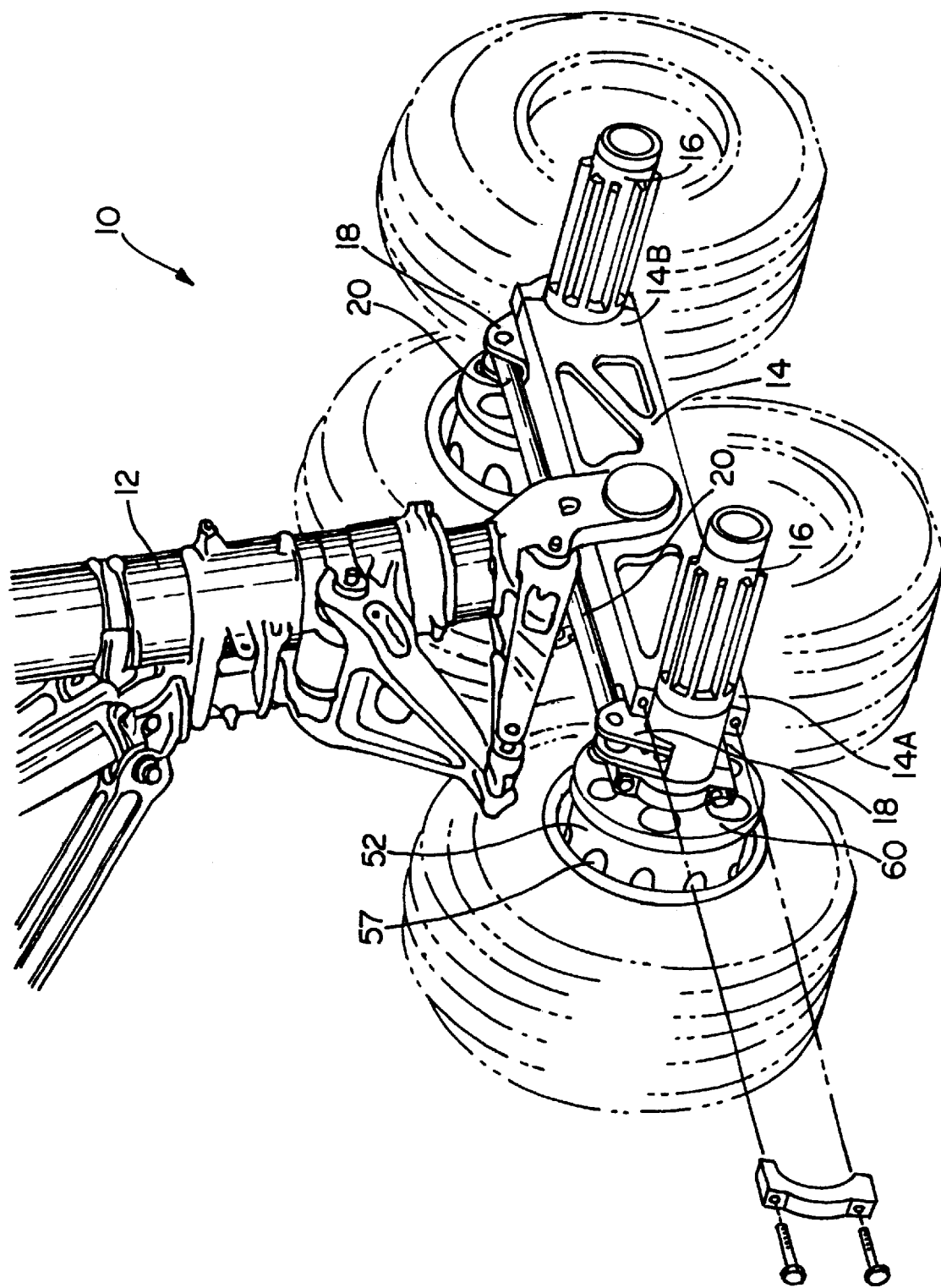
FIG. 1 illustrates an aircraft landing gear having single torque take-out arm and brake rod for each two-wheel brake axle in accordance with the present invention.
Figure 2:
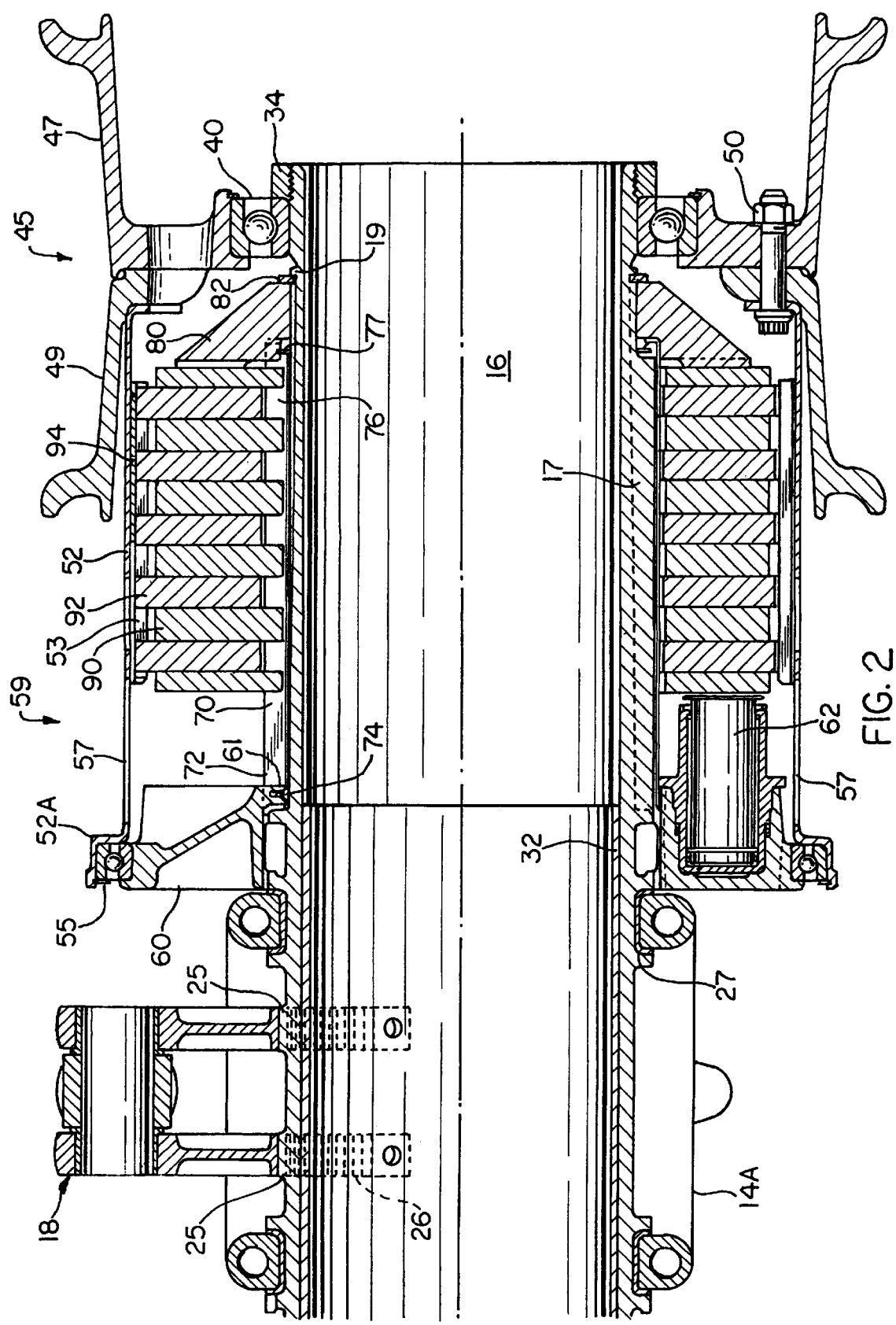
FIG. 2 is a section view of an aircraft brake in accordance with the present invention and which may be utilized in FIG. 1.
Figure 3:
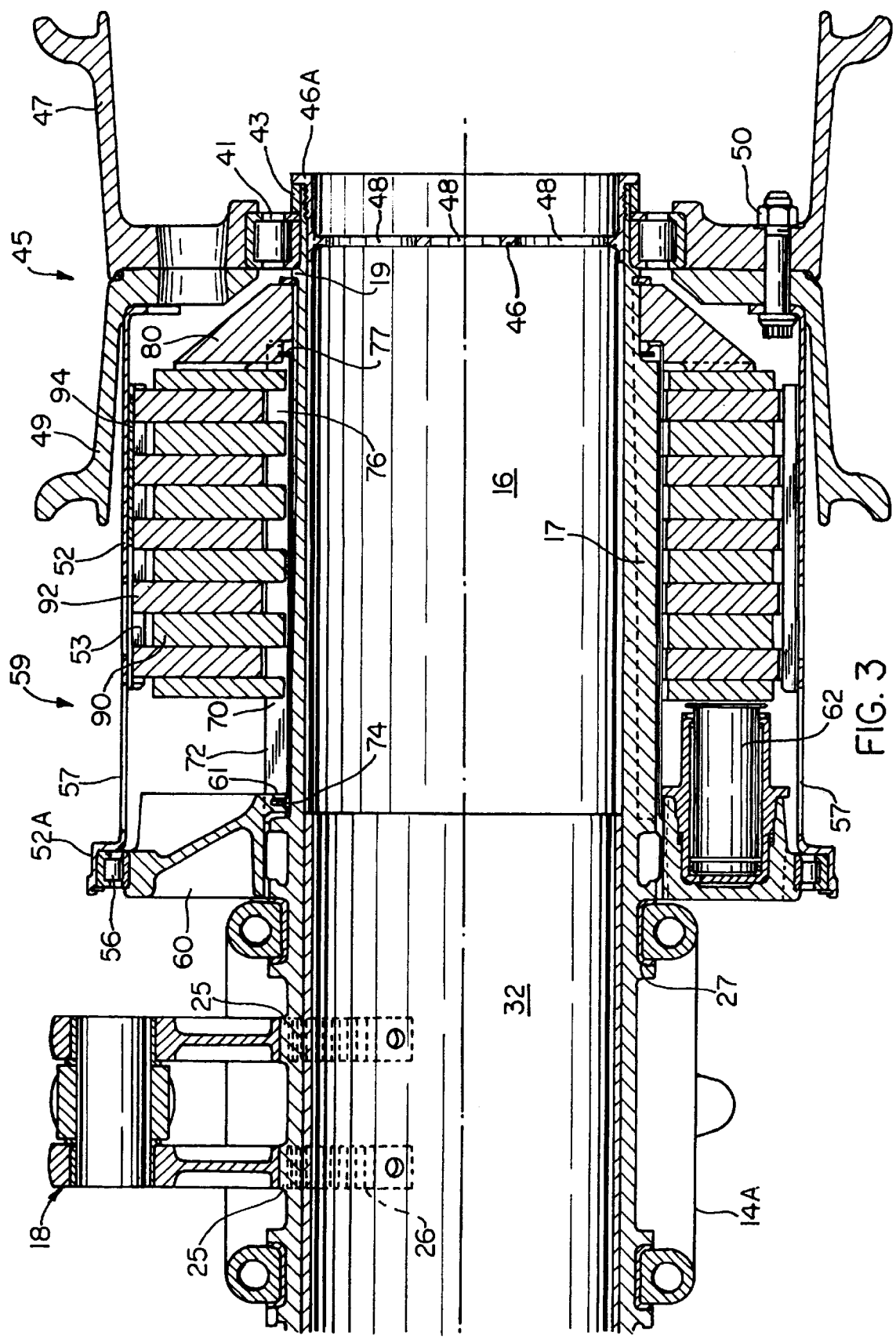
FIG. 3 is section view of a second embodiment of an aircraft brake in accordance with the present invention and which may be utilized in FIG. 1.

Referring to FIG. 1, the landing gear is designated generally by reference numeral 10 and includes a strut 12 and bogie beam 14 having ends 14A and 14B. Wheel and brake axles 16 are rotatable relative to the ends 14A and 14B to provide a damping interface for brake-induced vibration, and each is connected at its mid-section with a single torque take-out arm 18 which is connected with a brake rod 20 that is axially aligned with the strut 12. FIGS. 2 and 3 illustrate in further detail the brake axles 16, torque take-out arms 18, and wheels and other brake parts which may be utilized in either FIG. 1 or FIG. 4.

Referring to FIG. 2, the wheel and brake axle 16 has a series of inboard spaced-apart splines 25 which mesh with spaced-apart splines 26 of the single torque take-out arm indicated generally by reference numeral 18. Located about torque take-out arm 18 is a section view of the bogie beam 14A which is journaled to the wheel and brake axle 16 via a split bearing 27. The use of the split bearing 27 is an option which can enable a reduction in axle weight and outer diameter thereof. Located within the inner, open diameter of wheel and brake axle 16 is an interference fit aluminum sleeve 32 which conducts heat inboard and away from the piston housing 60. At the open end of axle 16, an axle nut 34 is threadedly connected and positions a bearing assembly 40 that supports a wheel designated generally be reference numeral 45. Wheel 45 includes an outboard wheel half 47 and an inboard wheel half 49. Connected with inboard wheel half 49 via wheel bolt/nuts 50 is a drum drive 52 that extends axially inboard to drum drive end 52A. A piston housing 60 including therein a plurality of piston assemblies 62 and not shown adjuster mechanisms is located about wheel and brake axle 16 and radially inwardly of drum drive end 52A. Providing support for drum drive end 52A in brake 59 is a bearing assembly 55 located between a radially outer portion of piston housing 60 and the drum drive end 52A. Axle 16 includes a plurality of splines 17 about its outer circumference and these mesh with a plurality of radially inwardly located splines 61 of piston housing 60 such that piston housing 60 is connected non-rotatably with axle 16. A spline sleeve 70 extends axially from the piston housing 60 to a backing plate or thrust cone 80. Spline sleeve 70 is connected at spline end 72 via a plurality of screws 74 with the piston housing spline 61, and its other end 76 is connected via a snap ring 77 with thrust cone 80. Spline sleeve 70 extends over each of the splines 17 of a)de 16 and provides a positive connection between piston housing 60 and thrust cone 80. Thrust cone 80 is positioned axially by an outer snap ring 82 which abuts an abutment 19 of wheel and brake axle 16. A plurality of stator discs 90 each have a central opening with slots which receive the splines 17 and spline sleeve 70 such that the stators are connected non-rotatably with axle 16. Interleaved between stators 90 is a plurality of rotor discs 92 which have about their circumference a plurality of slots which engage the splines 53 of drum drive 52. The splines 53 can be either integral with or attached to the drum drive 52. Thus, the rotors are connected non-rotatably with the drum drive 52 which is connected to the rotatable wheel 45. Optionally, a layer of insulation or wheel heat shield 94 may be provided to protect the inboard wheel half 49. Drum drive 52 also includes vent holes 57 so that air may move freely therethrough and provide for dissipation of heat away from the brake which is designated generally by reference numeral 59.

During operation of brake 59, hydraulic pressure is transmitted to the plurality of pistons 62 which are displaced axially toward wheel 45 to compress the rotating rotors 92 between the stationary stators 90 and thrust cone 80. The outer snap ring 82 and abutment 19 retain the thrust cone 80 in an axially stationary position. The compression of the rotors 92 between the stators 90 retards and terminates the rotation of the rotors, drum drive 52 and wheel 45 to effect braking of the wheel and not shown tire.

Referring to FIG. 3, similar structure will be indicated by the same reference numerals utilized in FIG. 2. FIG. 3 illustrates that a roller bearing assembly 41 may be utilized to support the wheel 45. The bearing assembly 41 is held axially in place by the abutment 19 of axle 16 and an annular spacer 43 held in place by a bulkhead nut 46. Bulkhead nut 46 is threadedly connected with the inner diameter of the open end of wheel and brake axle 16, and contains a plurality of openings 48 for the movement of air therethrough. Bulkhead nut 46 may comprise a high conductivity, high specific heat material in order to aid conduction of heat away from bearing assembly 41. The radially outer flange 46A provides an axial abutment for the spacer 43 in order to axially position the bearing assembly 41. An inboard bearing assembly 56 with roller bearings may be utilized between drum drive end 52A and piston housing 60.

Figure 4:
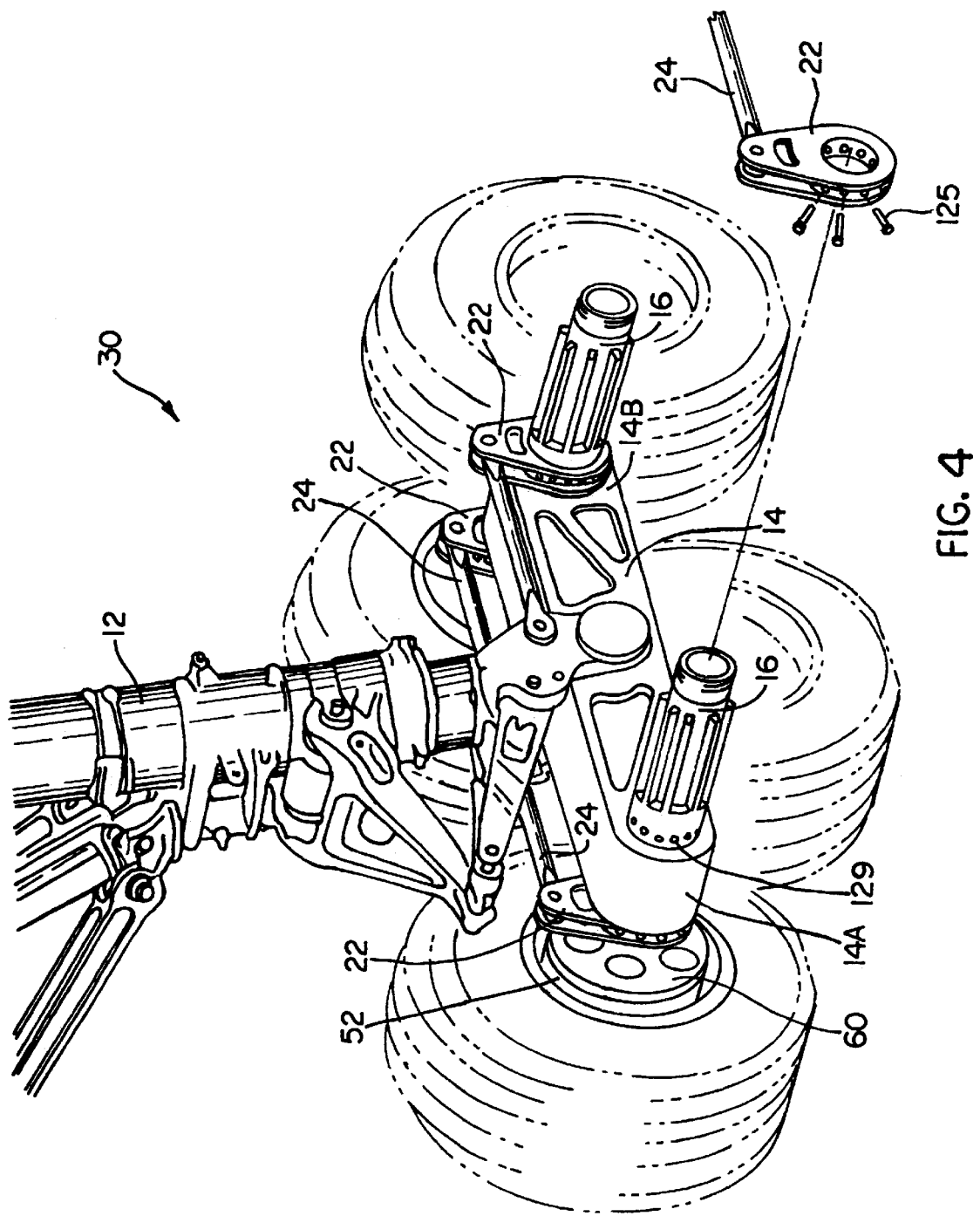
FIG. 4 illustrates an aircraft landing gear having a pair of torque take-out arms and brake rods for each two-wheel axle and which may utilize the brakes of FIGS. 2 and 3.

FIG. 4 illustrates an aircraft landing gear designated generally by reference numeral 30 which includes a strut 12 extending to and connected with a multi-axle bogie beam 14 having opposite axial ends 14A and 14B. A pair of rotatable wheel and brake axles 16 are connected with each of the lateral ends. Each rotatable wheel and brake axle 16 is connected non-rotatably to two torque take-out arms 22, and each torque take-out arm 22 is connected to a brake rod 24 that is connected to the strut 12. As shown in the partial exploded view, the torque take-out arms 22 may be attached to axles 16 by a series of nuts/bolts 125 and axle openings 129 (see also FIG. 6). If size limitations prevent the use of an axle sufficiently long enough for two torque take-out arms 22, then standard torque take-out arms integral with the piston housings may be connected with the brake rods 24.

The present invention provides the advantage of either the pair of torque take-out arms 22 of FIG. 4 being connected with the respective brake axles 16 and brake rods 24 in order to transfer the braking torque or the single torque take-out arm 18 of FIG. 1 being connected with wheel and brake axle 16 to transfer braking torque.

In FIGS. 2 and 3, parts of the brake comprising the spline sleeve 70, thrust cone 80, piston housing 60, stators 90 and rotors 92 may be slid axially off wheel and brake axle 16, thereby enabling easy removal and installation. The drum drive 52 is supported at its inboard end by a thin-section, large diameter bearing 55 or 56 located between end 52A and piston housing 60. The utilization of drum drive 52 locates the rotors radially inwardly of inboard wheel half 49 thereby lessening the amount of heat that may be transferred to the inboard wheel half. Ventilation holes 57 at the inboard end of drum drive 52 enable convection of heat away from the axle and inboard brake discs. The base material of the drum drive 52 may have a lower E-modulus than that of the axle material, thereby limiting the transfer of bending loads from the axle to the drum. The preloaded ball bearing assembly 40 is located close to the wheel center line and able to carry most of the radial load, moment loads, and all of the outboard directed axial loads. The angular contact type inboard ball bearing assembly 55 enables all of the inboard-directed loads, as well as, moment loads to be carried by that assembly. In FIG. 3, the cylindrical roller bearing 41 carries most of the radial load, moment loads, and all axial loads, while roller bearing 56 reacts moment loads. The webbed bulkhead nut 46 adds rigidity to the end of the wheel and brake axle in addition to a providing conductive heat sink.

Also, because the brake structure extends inboardly of the inboard wheel half 49, thicker discs can be used to provide an increase in wearable brake material and/or heat sink mass.

Figure 5:
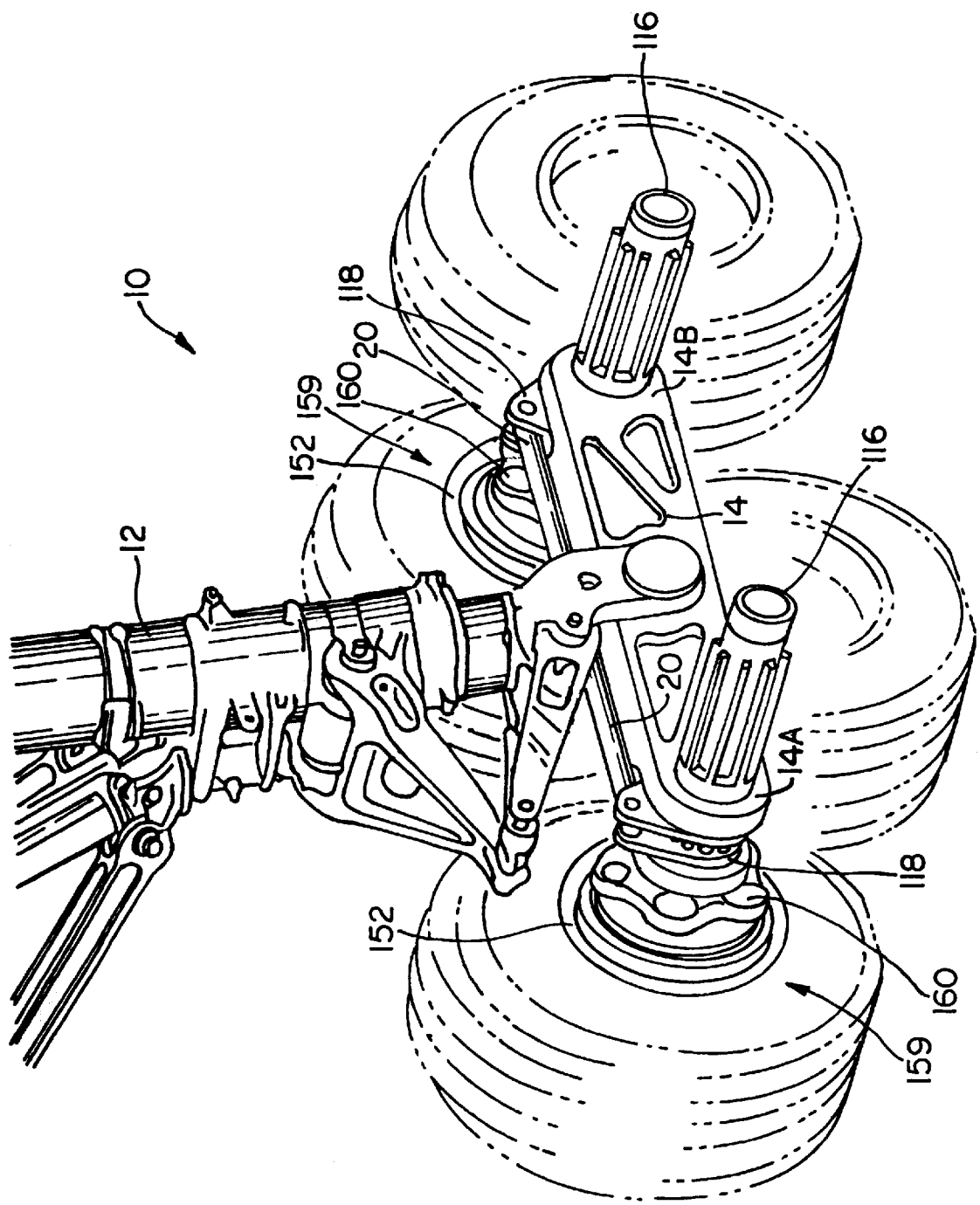
FIG. 5 illustrates an aircraft landing gear having a single torque take-out arm and brake rod for each two-wheel axle and which includes the brake of FIG. 6.
Figure 6:
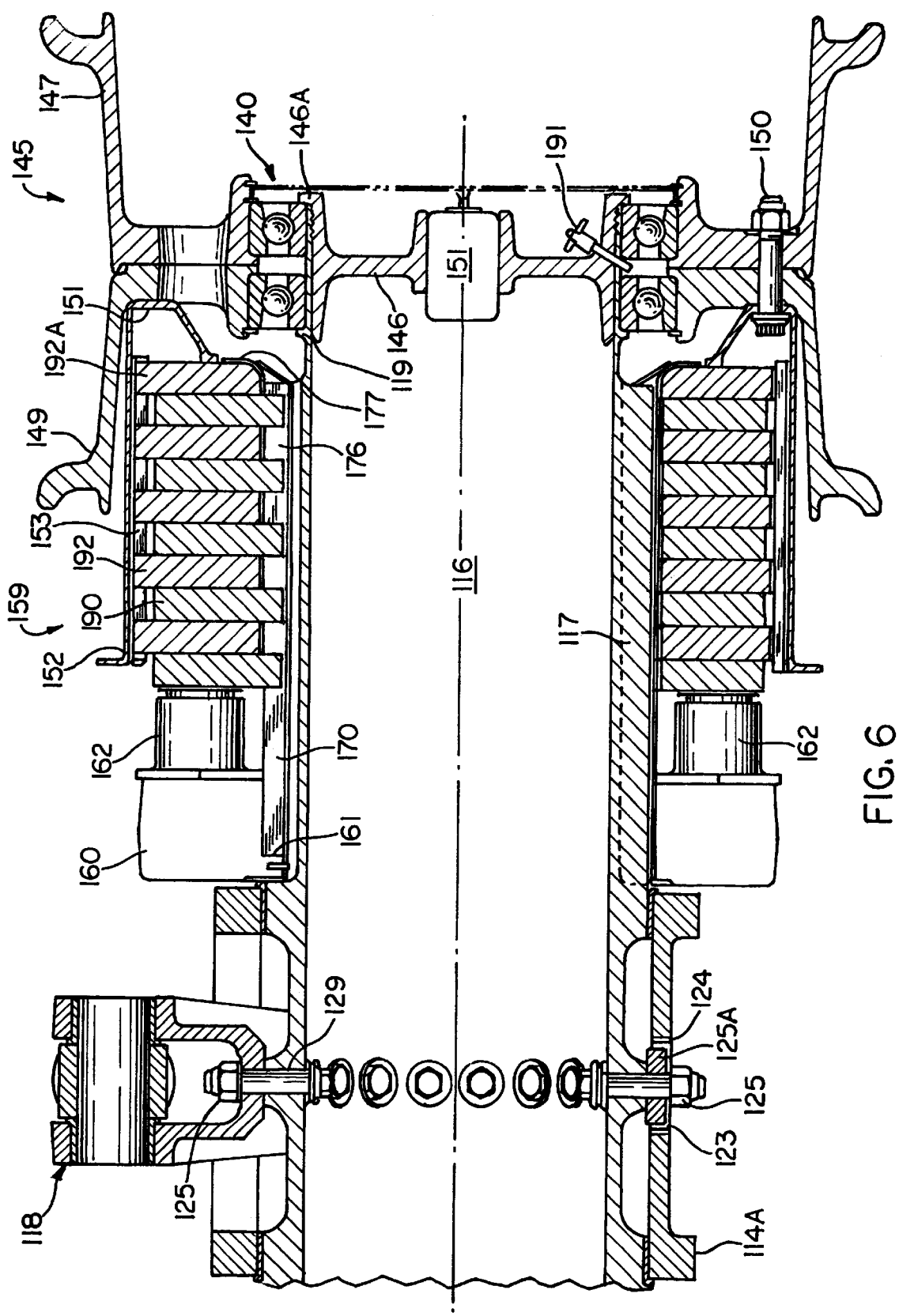
FIG. 6 is a section view of a third embodiment of an aircraft brake in accordance with the present invention and which may be utilized in FIG. 5.

FIG. 5 illustrates the landing gear shown in FIG. 1, except the bogie beam does not use a split bearing and each aircraft brake 159 is the brake illustrated in FIG. 6. FIG. 6 illustrates a third embodiment of the aircraft brake in accordance with the present invention. Similar structure is indicated by the same reference numeral increased by one hundred. Aircraft brake 159 includes a brake axle 116 having a plurality of spaced apart splines 117 located about its outer circumference. Splines 117 are covered by spline sleeve 170 and mesh with a plurality of piston housing splines 161 such that the piston housing 160 is connected non-rotatably with the wheel and brake axle 116. End 176 of spline sleeve 170 includes an annular, radially outwardly extending flange 177 adjacent a rotor disc 192A. Wheel and brake axle 116 includes about its circumference a plurality of bolt openings 129 which receive nuts and bolts 125 that attach the torque take-out arm 118. Torque take-out arm 118 is attached non-rotatably to wheel and brake axle 116 by the plurality of nuts ands bolt 125, and certain ones of nuts and bolts 125 also attach slot members 125A received within complementary shaped openings 123 of bogie beam 114A to provide a mechanism for restricting the lateral movement of wheel and brake axle 116 relative to the bogie beam 114. Openings 123 may include slot bearing pads 124. Brake 159 further comprises the piston housing 160 with a plurality of pistons 162, a plurality of stators 190 having an interior opening with slots to connect non-rotatably with splines 117 and spline sleeve 170, and rotor discs 192 having about their circumference a plurality of slots engaging the splines 153 of drum drive 152. Drum drive 152 is connected by means of nuts and bolts 150 to the wheel 145. Wheel 145 comprises an inboard wheel half 149 and an outboard wheel half 147, both wheel halves being mounted by means of bearing assemblies 140 upon wheel and brake axle 116. The bearing assemblies 140 are held axially in place between an axle abutment 119 and a bulkhead nut 146 received threadedly within the end opening of wheel and brake axle 116. Bulkhead nut 146 includes a radially outer flange 146A that abuts the outboard bearing of bearing assembly 140. Bulkhead nut 146 also includes a central opening which receives a wheel speed sensor 151. Nut 146 is secured in place by an anti-rotation locking pin 191.

The drum drive 152 illustrated in FIG. 6 includes a thrust flange 151 extending in the inboard direction to engage the adjacent rotor disc 192A sometimes known as a rotor backing plate. During operation of brake 159, hydraulic pressure causes the pistons 162 to be displaced axially toward wheel 145 to compress the rotating rotors 192 between the stationary stators 190 and the thrust flange 151. The thrust flange 151 retains the rotor backing plate 192A in an axially stationary position. Compression of the rotors 192 between the stators 190 retards and terminates the rotation of the rotors, drum drive 152 and wheel 145 to effect braking of the wheel and not shown tire. The braking torque is transmitted to the wheel and brake axle 116 which transmits the braking torque to the brake torque take-out arm 118 and brake rod 20. Like the previous embodiments, the spline sleeve 170 is at one end attached to the piston housing 160 and at the other end has a mechanism (flange 177 in FIG. 6) adjacent the rotor backing plate which enables the brake 159 to be slid axially as a unit off of the wheel and brake axle 116, thereby enabling easy removal and installation and also overhaul of the rotor and stator discs.

The present invention does not require the use of a torque tube as generally used in many prior aircraft brake structures, and therefore can provide a reduction in weight. It can provide a more robust and dynamically stable structure with more predictable stresses and dynamic response. There are fewer parts utilized in the brake which includes the torque take-out arm and brake rod structures of FIGS. 1–6. Also, the brake axle to bogie beam interface can provide positive damping of brake-induced vibrations.

I claim:

1. Aircraft wheels and brakes in combination with a multiaxle bogie beam having at least two brake axles connected operatively with a strut of an aircraft, comprising a piston housing located about each respective brake axle, a plurality of stator discs disposed about a respective brake axle so as to transfer braking torque to the respective brake axle, a plurality of rotor discs, a wheel mounted rotatably on the respective brake axle and connected with the rotor discs, at least one brake torque take-out arm separate from and connected non-rotatably with the respective brake axle, the brake torque take-out arm being connected with a brake rod connected with the strut of an aircraft wherein the brake rod and strut are separate from and located exteriorly the respective brake axle, and connection means between the torque take-out arm and respective brake axle in order to effect the non-rotatable connection therebetween.

2. The aircraft wheels and brakes in accordance with claim 1, wherein the torque take-out arm and respective brake axle each have complementary shaped openings located therein and receive the connection means.

3. The aircraft wheels and brakes in accordance with claim 1, wherein the connection means comprises bolts and nuts.

4. The aircraft wheels and brakes in accordance with claim 1, wherein the connection means further comprises a mechanism for limiting axial displacement of the respective brake axle relative to the landing gear of the aircraft.

5. The aircraft wheels and brakes in accordance with claim 1, wherein the connection means comprises spline means located on the torque take-out arm and respective brake axle.

6. Aircraft wheel and brake in combination with an axle bogie beam having a brake axle connected operatively with a strut of an aircraft, comprising a piston housing located about the brake axle, a plurality of stator discs disposed about the brake axle so as to transfer braking torque to the brake axle, a plurality of rotor discs, a wheel mounted rotatably on the brake axle and connected with the rotor discs, at least one brake torque take-out arm separate from and connected non-rotatably with the brake axle, the brake torque take-out arm being connected with a brake rod connected with the strut of an aircraft wherein the brake rod and strut are separate from and located exteriorly of the brake axle, and connection means between the torque take-out arm and brake axle in order to effect the non-rotatable connection therebetween.

7. The aircraft wheel and brake in accordance with claim 6, wherein the torque take-out arm and brake axle each have complementary shaped openings located therein and receive the connection means.

8. The aircraft wheel and brake in accordance with claim 6, wherein the connection means comprises bolts and nuts.

9. The aircraft wheel and brake in accordance with claim 6, wherein the connection means further comprises a mechanism for limiting axial displacement of the brake axle relative to the landing gear of the aircraft.

10. The aircraft wheel and brake in accordance with claim 6, wherein the connection means comprises spline means located on the torque take-out arm and respective brake axle.

11. A brake torque take-out mechanism in combination with an aircraft wheel and brake, comprising an axle bogie beam having a brake axle connected operatively with a strut of an aircraft, the brake axle having the aircraft wheel and brake disposed thereabout with the brake transferring braking torque to the brake axle, at least one brake torque takeout arm separate from and connected non-rotatably with the brake axle, the brake torque take-out arm being connected with a brake rod connected with the strut of an aircraft wherein the brake rod and strut are separate from and located exteriorly of the brake axle, and connection means between the torque take-out arm and brake axle in order to effect the non-rotatable connection therebetween.

12. The mechanism in accordance with claim 11, wherein the torque take-out arm and brake axle each have complementary shaped openings located therein and receive the connection means.

13. The mechanism in accordance with claim 11, wherein the connection means comprises bolts and nuts.

14. The mechanism in accordance with claim 11, wherein the connection means further comprises a mechanism for limiting axial displacement of the brake axle relative to the landing gear of the aircraft.

15. The mechanism in accordance with claim 11, wherein the connection means comprises spline means located on the torque take-out arm and respective brake axle.

16. The mechanism in accordance with claim 11, wherein the brake axle is rotatable relative to the axle bogie beam.

\* \* \* \* \*